US006636858B1

(12) United States Patent
Coffey et al.

(10) Patent No.: US 6,636,858 B1
(45) Date of Patent: Oct. 21, 2003

(54) METHOD FOR FORMATTING, ASSOCIATING ORGANIZING, AND RETRIEVING DATA OF AND FROM A DATABASE STORED IN A COMPUTER SYSTEM

(76) Inventors: Michael T. Coffey, 351 Lowell Dr., Santa Clara, CA (US) 95051; Richard G. Waugh, Jr., 21465 Aldercroft Heights Rd., Los Gatos, CA (US) 95033

( * ) Notice: Subject to any disclaimer, the term of this patent is extended or adjusted under 35 U.S.C. 154(b) by 0 days.

(21) Appl. No.: 09/497,816

(22) Filed: Feb. 3, 2000

(51) Int. Cl.[7] .............................................. G06F 17/30
(52) U.S. Cl. .............................. 707/100; 707/1; 707/3; 707/6
(58) Field of Search ........................ 707/1, 6, 3, 100, 707/102

(56) References Cited

U.S. PATENT DOCUMENTS

| 5,467,471 A | * | 11/1995 | Bader | 707/1 |
| 5,617,567 A | * | 4/1997 | Doktor | 707/2 |
| 5,991,758 A | * | 11/1999 | Ellard | 707/2 |
| 6,014,647 A | * | 1/2000 | Nizzari et al. | 705/39 |
| 6,170,742 B1 | * | 1/2001 | Yacoob | 235/375 |
| 6,339,767 B1 | * | 1/2002 | Rivette et al. | 707/2 |

* cited by examiner

Primary Examiner—Greta Robinson
Assistant Examiner—Debbie M. Le
(74) Attorney, Agent, or Firm—Patrick Reilly (57) ABSTRACT

A database system comprising a novel process for the formatting, association, storage and retrieval of amorphous, structured or ordered data. The database system enables the dynamic accumulation and integration of unpredicted or unforeseen data, entities and relationships into a database. Each and every individual datum contained in the database system is associated with a unique license number. Each license number uniquely refers to only one entity, datum, attribute, relationship or relationship attribute. A unique entity license number is established, from which and to which entity attributes, relationships, relationship attributes and other entity license numbers are associated, structured and/or ordered. An entity license list contains a list of unique entity license numbers. Each attribute license includes a unique attribute license number, at least one unique entity license number, at least one value and optionally at least one name descriptor of a value.

3 Claims, 8 Drawing Sheets

| 46 | 48 4 | 52 | 54 |
|---|---|---|---|
| 2531 | 1005 | Insurer | Greencross |
| 2537 | 1005 | Bloodtype | OPOS |
| 2822 | 1724 | Dosage | 20 MG |
| 2943 | 1005 | Medrecords | 370 AG 2 |

| 24 | 26 | 28 |
|---|---|---|
| 4306 | 1005 | 1117 |
| 4307 | 1117 | 1005 |
| 4308 | 1539 | 1005 |
| 4310 | 1539 | 1117 |
| 4605 | 1724 | 1005 |
| 4931 | 1898 | 1724 |
|  |  |  |
|  |  |  |

FIG 7

| 6001 | 4306 | Parent | Mother |
| 6104 | 4307 | Child | Son |
| 6105 | 4308 | Child | Daughter |
| 6109 | 4310 | Relative | Sibling |
| 6304 | 4605 | Prescribed | Daily |
| 6801 | 4931 | Supply Chain | Distributer |
| | | | |
| | | | |

FIG 8

METHOD FOR FORMATTING, ASSOCIATING ORGANIZING, AND RETRIEVING DATA OF AND FROM A DATABASE STORED IN A COMPUTER SYSTEM

FIELD OF THE INVENTION

The present invention relates to the architecture of computer implemented database systems. More particularly, the present invention addresses requirements to flexibly associate, order and retrieve data within and from computer systems.

BACKGROUND OF THE INVENTION

Electronic information storage and management is a fundamental aspect of most business and government activities in the industrialized world. Even minimal improvements in the art of database design and structure can have profound effects in the operational efficiencies of numerous organizations and even entire sectors of the economy.

The exponential growth of data generated by Internet traffic has especially created huge opportunities for those enterprises that can rapidly benefit from the creative and innovative analyses of previously unavailable information. Yet conventional database designs are most effective in ordering and retrieving data in accordance with previously defined relationships among the data elements.

Additionally, large organizations typically have multiple points of data entry and management within a distributed computer network. These networks will usually receive data from a variety of sources and from numerous kinds of sources, such as Internet messages and manual transference from hard copy documents. Information management in these cases is made all the more challenging because the value and significance of the data being entered is often indefinite or unknown at the time of data capture by the system. In addition, the significance of data can change over time in unforeseeable ways.

There is, therefore, a long felt need in the art of computer implemented database design, generation and use to provide a method to flexibly create relatedness among the stored data elements in relationship patterns that are often of unforeseeable or unpredictable significance, nature or value at the time of entry of some of the data values.

OBJECTS OF THE INVENTION

It is an object of the present invention to provide a technique to relate data stored in a computer database to other data stored therein and that is related to a specified entity.

It is a further object of the present invention to provide a method to uniquely identify individual data stored in a computer database.

It is another object of the present invention to provide a methodology to relate new data to previously identified entity or to new a newly specified entity.

It is yet another object of the present invention to provide a computer implemented database system, which is oriented to the organization of amorphous data.

SUMMARY OF THE INVENTION

These and other objects and advantages of the present invention are achieved by the method of the present invention wherein the generation of a unique identification number is generated within or provided to, a computer implemented database system for an entity of interest. Consider that an entity of interest might be a customer, a project, a part, a supplier, an employee, an account a competitor, or any number of material, actual, fictional or abstract things, beings, persons, organizations, ideas, documents, files, wirings, formulations or constructs. Identifying the existence of an entity of interest within the database system can be accomplished by creating an Entity License with an Entity License Number Field. The Entity License Number is a number that is unique to, or uniquely distinguished from, all license numbers through out the database system.

Associating an attribute with an Entity License may be accomplished by creating an Attribute License. The Attribute License provides at least three fields, these necessary fields being an Attribute License Field, an Entity License Number Field, an Attribute Value Field. The Attribute License may contain other optional fields, such as an Attribute Name Field or additional Entity License Number Fields.

The Attribute License Number Field contains an Attribute License Number that is unique to, or uniquely distinguished from, all license numbers found within the database. The Entity License Number Field contains an Entity License Number to which the instant Attribute License is thereby associated. The Attribute Value Field specifies the Attribute Value that is associated with the referenced Entity. The optional Attribute Name Field may contain information that describes a category or quality of information to which the Attribute Value is related. The optional additional Entity License Num to which the Attribute Value is related. The optional additional Entity License Number Fields enable the association of the Attribute License, and thereby the Attribute Value with more than two Entity Licenses, by means of including at least one additional and relevant Entity License Number in the additional Entity License Number Fields.

An example of the design of an Attribute License might include the association of an Attribute Value of RED with an Attribute Name of COLOR and with a unique Entity License Number. The inclusion of additional Entity License Numbers in this example might allow the same Attribute License to associate the color of red with an automobile, an apple, a dress and a graphic image element.

Relationships between Entities can be recorded in the database by means of a Relationship License. A Relationship License minimally contains a Relationship License Number Field, a First Entity License Number Field and a Second Entity License Number Field. The Relationship License Field includes a Relationship License Number that is unique to, or uniquely distinguished from, all license numbers contained within the database. The First and Second Entity License Number Fields contain Entity License Numbers. The First and Second Entity License Numbers recorded in these two fields may be identical, as on occasion a relationship may be found to be self-referential, such as where a particular employee is authorized to change a status indicator relating to himself or herself. Either the First or Second Entity License Numbers may be designated with a FROM quality or a TO quality, whereby a vector or flow indicator is indicated the Relationship License. The FROM/TO vector of the Relationship License may be to inform the database system that the instant Relationship License presents a directional aspect of a relationship existing between two or more entities.

Additional optional Entity License Number Fields with additional Entity License Numbers may be included in a Relationship License whereby more than two Entities are designated as being related. These additionally generated Entity License Number Fields may alternately be designated as presenting FROM, TO or other qualities.

The indication of the FROM or TO qualities may alternately be made by the order of the Entity License Number Fields within in the Relationship License itself, or by the value of the Relationship License Number, or by some additional Tag Field Value, or by some other method known in the art. The indication of the relatedness of a specified quality, by any means disclosed herein or known in the art, to an Entity License Number or an Entity License Number Field is referred to herein as the tagging of the instant number or field.

The method of the present invention further comprises the creation of a fourth optional license, identified as a Relationship Attribute License. Relationship Attribute Values may be associated with designated Relationship Licenses by means of the Relationship Attribute License. A Relationship Attribute License format contains at least a Relationship Attribute License Number Field, a Relationship License Number Field and a Relationship Attribute Value Field. The Attribute License format may further contain other optional fields, such as a Relationship Attribute Name Field or additional Relationship License Number Fields.

The Relationship Attribute License Number Field contains a Relationship Attribute License Number that is unique to, or uniquely distinguished from, all license numbers found within the database. The Relationship License Number Field contains a Relationship License Number to which the instant Relationship Attribute License is thereby associated. The Relationship Attribute Value Field presents the Relationship Attribute Value that is associated with the referenced Relationship License. The optional Relationship Attribute Name Field may contain information that describes or denotes a category or quality of information to which the Relationship Attribute Value is related or designated as being associated with. The optional additional Relationship License Number Fields enable the association of the Relationship Attribute License, and thereby the Relationship Attribute Value contained therein, with more than one Relationship License, by means of including at least one additional Relationship License Number in the additional Relationship License Number Fields.

An example of the design of a Relationship Attribute License might include the association of an Relationship Attribute Value of MOTHER, and optionally denoting a Relationship Attribute Name of PARENT, with a unique Relationship License, wherein an Entity License tagged with a FROM quality denotes a patient Mary Smith and a Entity License tagged with a TO quality, identifies a child Frank Smith, are specified. The inclusion of additional Relationship License Fields and Numbers in this example Relationship Attribute License might allow the same Relationship Attribute License to associate Mary Smith's parental state of motherhood with more than one child.

The flexibility of the method of the present invention allows for the association of data to an established Entity License by the database system in cases where the desire or intent to include such new data as associative with the Entity License was wholly unexpected or even unforeseeable. This characteristic of the method of the present invention enables the present invention to provide an evolving capability to a data base system, where the structure of the interrelatedness of the data develops in to meet unpredicted data management requirements of data base system users.

BRIEF DESCRIPTION OF THE DRAWINGS

These, and further features of the invention, may be better understood with reference to the accompanying specification and drawings depicting the preferred embodiment, in which.

DETAILED DESCRIPTION OF THE PREFERRED EMBODIMENT

In describing the preferred embodiments, certain technology will be utilized for the sake of clarity. Such terminology is intended to encompass the recited embodiment, as well as all technical equivalents which operate in a similar manner for a similar purpose to achieve a similar result. The various preferred embodiments of the method of the present invention are implemented in structured query language, or SQL, object oriented database systems, XML server data base systems, file server systems, and other database systems known in the art.

Suppose that we are seeking to architect and implement a database structure that enables our organization or corporation to capture, organize and relate varieties of data about many categories of interrelated entities. The data varieties might include or describe documents, registration numbers, medical records, legal histories, financial transactions, budgetary specifications, credit evaluations, medications, chemical compositions, musical compositions and other data of these and other data types known in the art, to include graphical, visual, audio, numerical and textual. The entities of interest to our enterprise might include corporate departments, teams, agencies, persons, patients, consultants, suppliers, manufacturers, serial numbers, products, tools, documents, instructions, electronic messages, ideas, brand names, constructs, graphic images, sounds, words, dates, locations, parts, part numbers, slogans, and other entity types known in the art.

Let us further suppose that we are part of a medical service organization and that we are receiving information relevant to our patients, their children, medications and pharmaceutical suppliers from a variety of sources to include Internet transmissions, electronic messages and other Internet transactions, printed medical journals, radio bulletins, patient interviews, written annotations, dictation transcripts, handwritten notes and other sources.

The preferred embodiment may be implemented in a computer system using an operating system such as UNIX, Linux, HPUX, Windows 95, Windows 98, or NT. The preferred embodiment may run under an SQL system such as Microsoft Access or another database system known in the art.

Figure 1A:
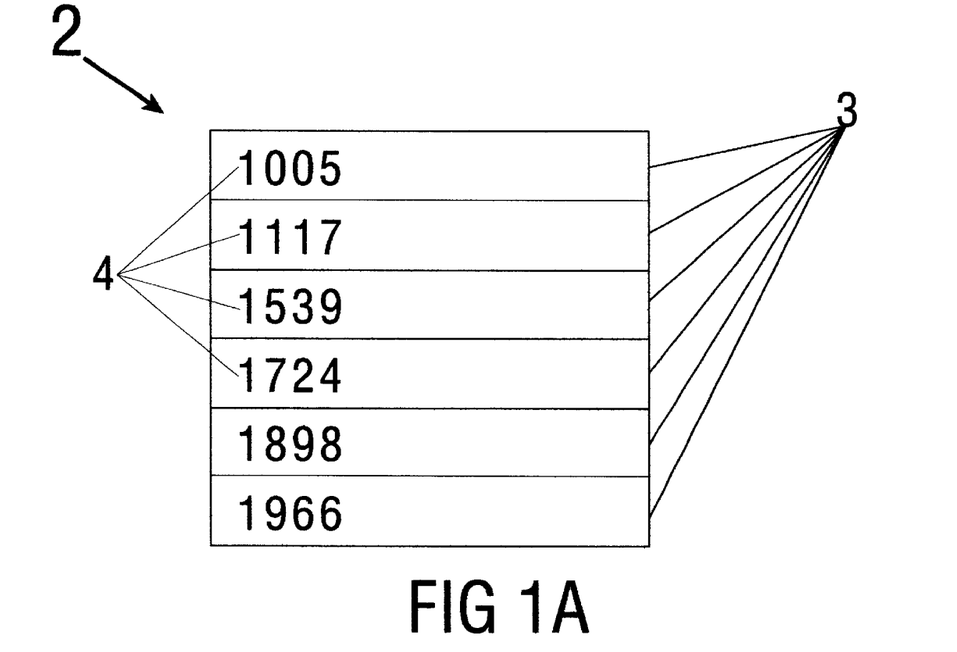
FIG. 1A depicts a list of Entity Licenses.
Figure 1B:
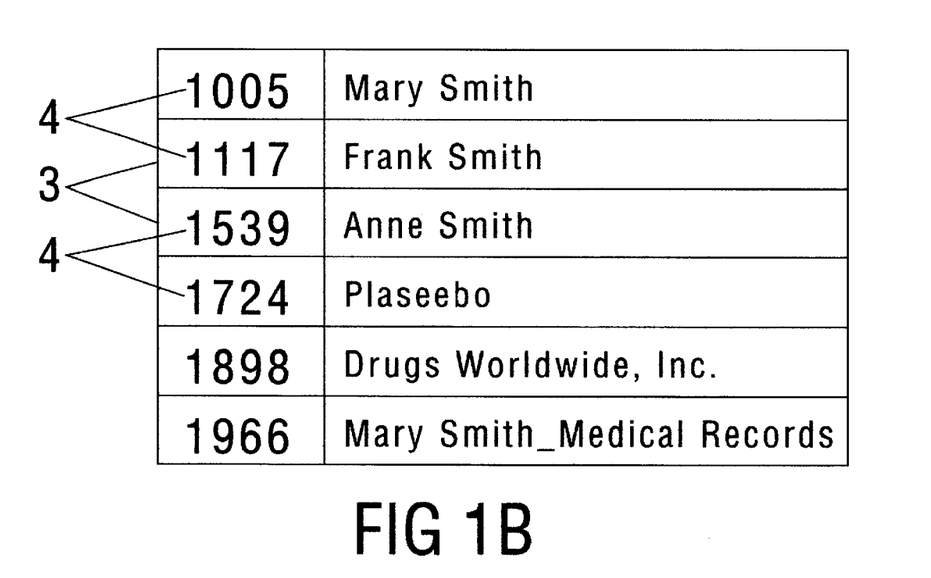
FIG. 1B is a tabular representation of the list of Entity License Numbers of FIG. 1A and the entities that which these Entity License Numbers serve to identify.

Referring now to FIGS. 1A and 1B, the preferred embodiment of a computer implemented database system designed to address the requirements and conditions of our enterprise includes the generation of Entity Licenses 2 for those entities of interest or value to our considerations. An Entity License 2 comprises an Entity License Number Field 3 and an Entity License Number 4 stored within the Entity License Number Field 3. FIG. 1A describes a stack of Entity Licenses 2. FIG. 1B is an explanatory table and displays the Entity License Numbers 4 of FIG. 1A against actually existing entities to which each Entity License 2 of FIG. 1A is intended to relate. A patient Mary Smith is referred to by a unique Entity License Number 4 of 1005, her two children Frank and Anne are each uniquely identified by their respective Entity License Numbers 4 of 1117 and 1539. Mary Smith's medical history file is also identified by a unique Entity License Number 4 of 1966, as is a medication Plaseebo by the Entity License Number 4 of 1724, and the manufacturer of Plaseebo, Drugs Worldwide Inc., by the Entity License Number 4 of 1898.

Figure 2:
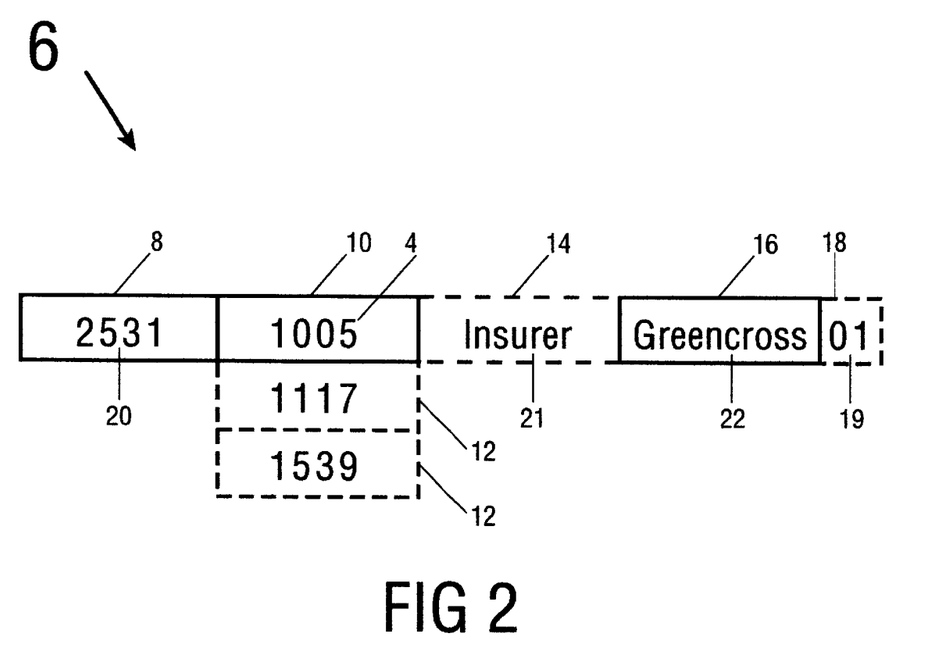
FIG. 2 depicts an Attribute License Format.

Referring now to FIG. 2, the format of an Attribute License 6 includes an Attribute License Number Field 8, an Entity License Number Field 10, optional Additional Entity License Number Fields 12, an optional Attribute Name Field 14, an Attribute Value Field 16 and an optional Flag Field 18. The Attribute License 6 of FIG. 2 is identified by an Attribute License Number 8 of 2531. The Attribute License Number 20 is stored in the Attribute License Number Field 8. Each Attribute License Number 20 is unique, or uniquely identifiable through out the database structure. The Entity License Number 4 of 1005 stored in the Entity License Number Field 10 specifies that the Attribute License 6 refers to the Entity License 2 that exists to relate information relevant to one Mary Smith. The optional Additional Entity License Number Fields 12 may be used to associate the Attribute License 6 with other Entity Licenses 2 in addition to the Entity License 2 associated with Mary Smith. The optional Attribute Name Field 14 stores an Attribute Name 21 of INSURER. The Attribute Value Field 16 stores Attribute Value 22 of GREENCROSS, GREENCROSS being the name of an insurer that is related in some way to Mary Smith. The optional Flag Field 18 contains a binary pattern 19 that informs the database about the nature of the Attribute License 6, such as whether this Attribute License 6 of FIG. 2 includes only one or more than one Entity License Number Fields 4,12, or whether this Attribute License 6 does or does not include an Attribute Name Field 14. The database manager may, for example, structure a single Attribute License 6 to relate the medical insurance company of Green Cross to Mary Smith only, or additionally to Mary, Frank and Anne Smith.

Figure 3A:
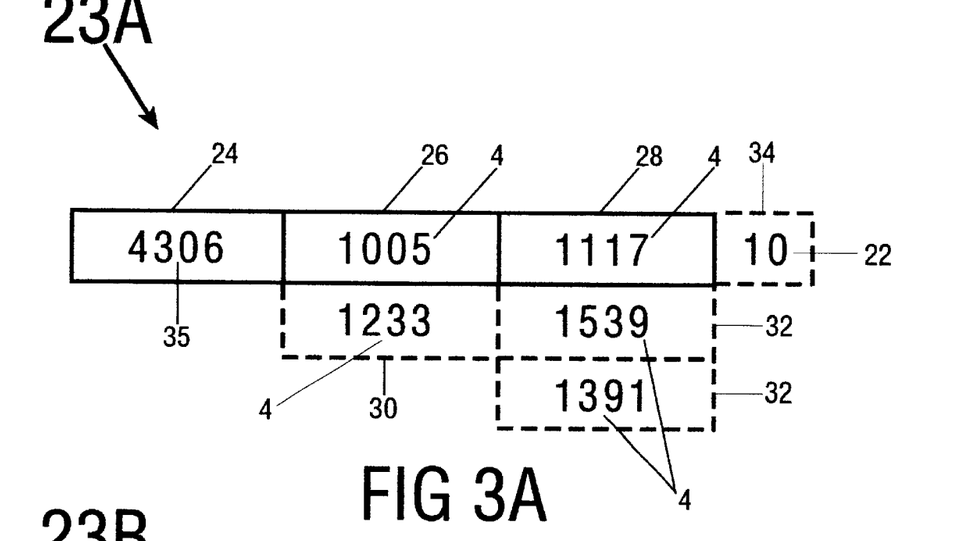
FIGS. 3A, 3B and 3C depict alternate embodiments of Relationship License Formats.

Referring now to FIG. 3A, the format of a Relationship License 23A includes a Relationship License Number Field 24, a FROM Entity License Number Field 26, a TO Entity License Number Field 28, optional Additional FROM and TO Entity License Number Fields 30, 32, and an optional Flag Field 22. The designation of an Entity License Number 4 included in the Relationship License 23A as being a FROM or a TO Entity License Number 4 is determined in the format presented in FIG. 3A by the placement of the Entity License Number 4 within the Relationship License 23A. These TO and FROM qualities of the Entity License Numbers 4 are not intrinsic to the Entity License Numbers 4 but are established by the structure of the Relationship License 23A, or by a combination of the format of the Relationship License 23A, a binary pattern 22 contained in the optional Flag Field 34, and/or programming of the database processing tools. The Relationship License Number Field 24 contains a Relationship License Number 35 of 4306. This number of 4306 is unique or uniquely distinguishes the Relationship License 23A of FIG. 3A from all other License Numbers 4, 20, 35& 58 of the database system. The FROM Entity License Number Field 26 contains the Entity License Number 4 of 1005. The TO Entity License Number Field 28 contains the Entity License Number 4 of 1117. As discussed above, the Entity License Number 4 of 1005 is used as a marker to which data that is determined to be relevant to Mary Smith may be linked or referred. The Entity License Number 4 of 1117, as mentioned previously, refers to Frank Smith, and this Entity License Number 4 of 1117 may be used to note within the computer database that specified information is related to the person of Frank Smith. The optional Flag Field 34 contains the binary pattern 22 that may inform the database about the nature of the Relationship License 23A, such as whether this Relationship License 23A includes only one or more than one FROM Entity License Number Fields 26, 30, and whether this Relationship License includes only one or more than one TO Entity License Number Fields 28, 32.

Figure 3B:
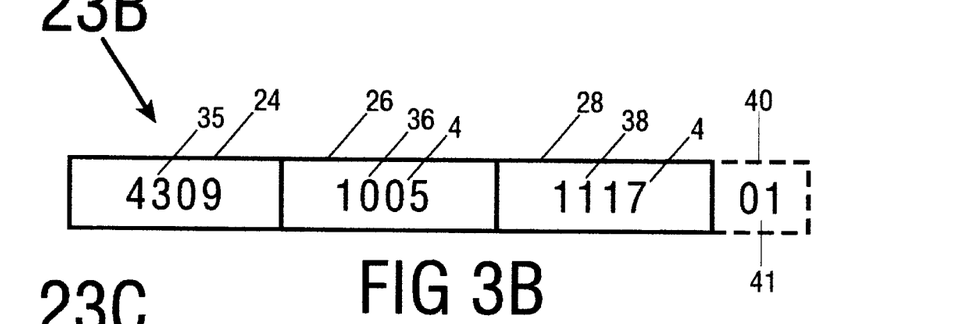

Referring now to FIG. 3B, an alternate design of a Relationship License 23B includes a Relationship License Number 35, a First Entity License Number 36,4, a Second Entity License Number 38, 4 and an optional Tag Field 40. The Tag Field 40 indicates to the computer system implementing the database that the First Entity License 36, 4 has a TO quality appended and that the Second Entity License 38, 4 has a FROM quality appended. This alternate preferred embodiment of the Relationship License 23B actualizes the designation of TO and FROM qualities, and potentially other qualities or characteristics known in the art, to Entity Licenses 2 within an alternate format of a Relationship License 23B. It is noteworthy that the placement of the Entity License Numbers 4 within the Relationship License 23B of FIG. 3B is not wholly determinative of qualities that may by appended to either Entity License Numbers 4.

Figure 3C:
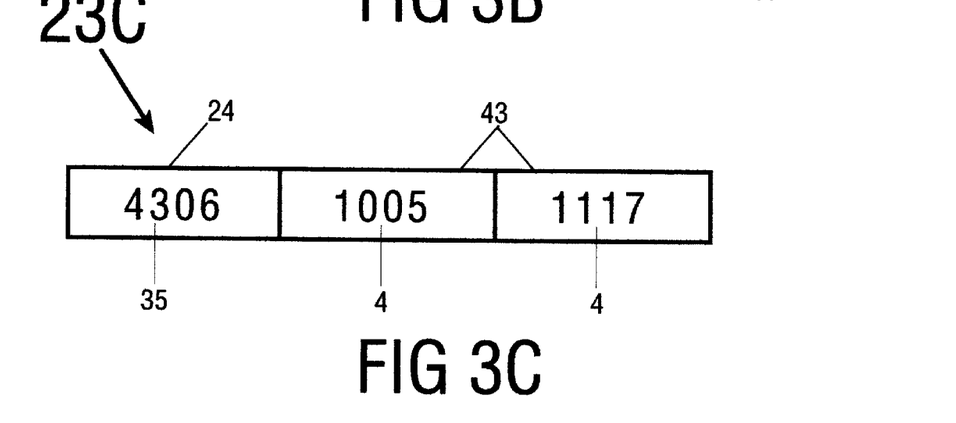

Referring now to FIG. 3C, a Relationship License 23C has two Neutral Entity License Number Fields 43 and thereby simply denotes that the Entity License Number 4 of 1539 for Anne Smith and the Entity License Number 4 of 1117 for Frank Smith are related and that this Relationship License 23C has no FROM or TO qualities related to either of the two included Neutral Entity License Number Fields 43 or Numbers 4.

Figure 4:
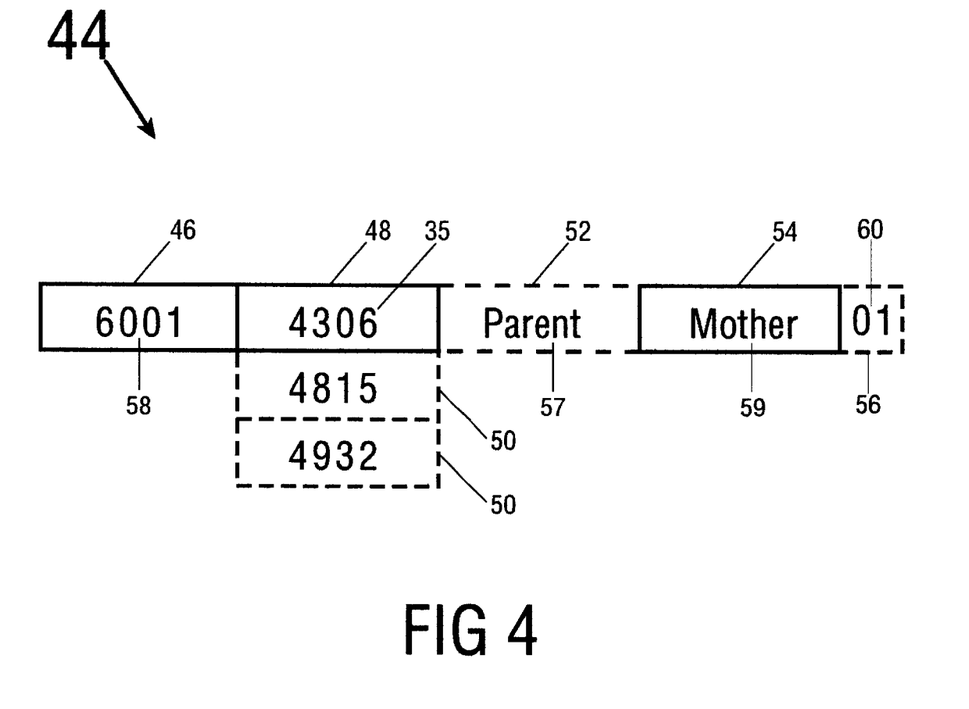
FIG. 4 depicts a Relationship Attribute License Format.

Referring now to FIG. 4, the format of a Relationship Attribute License 44 includes Relationship Attribute License Number Field 46, a Relationship License Number Field 48, optional Additional Relationship License Number Fields 50, an optional Relationship Attribute Name Field 52, a Relationship Attribute Value Field 54 and an optional Flag Field 56. The Relationship Attribute License 44 of FIG. 4 is identified by a uniquely distinguishable Relationship Attribute License Number 58 of 6001. This Relationship Attribute License Number 58 of 6001 is stored in the Relationship Attribute License Number Field 46. Each Relationship Attribute License Number 58 is unique, or uniquely identifiable through out the database structure. The Relationship License Number 35 of 4306 stored in the Relationship License Number Field 48 specifies that the Relationship Attribute License 23A of FIG. 4 refers to the Relationship License 23A that defines a relationship existing between the Entity License 2 for the person of Mary Smith and the Entity License 2 for Frank Smith. The optional Additional Relationship License Number Fields 50 may be used to associate the Relationship Attribute License 44 of FIG. 4 with other Entity Licenses 2 in addition to the Entity License 2 associated with the Relationship License 4306. The optional Relationship Attribute Name Field 52 stores a name 57 of PARENT. The Relationship Attribute Value Field 54 stores a value 59 of MOTHER, mother being a name of a relatedness that exists Mary Smith and her son Frank Smith. The optional Flag Field 56 contains a binary pattern 60 that informs the database about the nature of the Relationship Attribute License 44, such as whether this Relationship Attribute License 44 includes only one or more than one Relationship License Number Fields 48, 50, or whether this Relationship Attribute License 44 does or does not include a Relationship Attribute Name Field 52. The database manager may, for example, wish to structure a single Relationship Attribute License 44 to denote that various persons identified by the database are mothers of various other persons identified by the database.

Referring now to FIGS. 3A, 3B and 4, the optional Flag and Tag Fields 34, 40 may be expanded to include additional data in a Relationship License 23A, 23B such as indications of or information about the relationship type, or Relationship Attribute Names 57 and/or Relationship Values 59.

Suppose that we wish to enter into the database information about Mary Smith, and that we wish to further relate certain entities to Ms. Smith and various information about these third parties to Ms. Smith. The method of the present invention enables the generation of a database that flexibly accepts the attachment, by relation, of information, attributes, relationships and relationship attributes in an elegant and efficient manner. This characteristic of the method of the present invention allows a database manager or architect to evolve a database to integrate information, relationships and relationship types that may not have been foreseen, predicted or anticipated for in the creation and development of the database.

Figure 5:
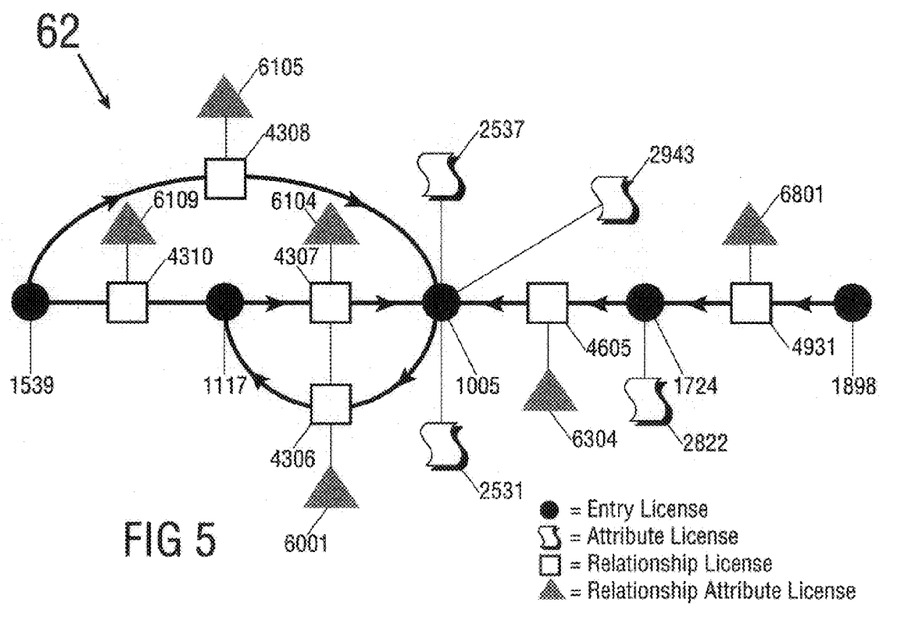
FIG. 5 is a relationship diagram of a simple database designed in accordance with the method of the present invention.

Referring now to the Figures and particularly to FIG. 5, a relationship diagram presented by FIG. 5 describes elements of a database 62 designed in accordance with the method of the present invention. The database structure 62 includes Entity Licenses 2 for Mary Smith, her children Frank Smith and Anne Smith, a medication Plaseebo and distributor Drugs Worldwide, Inc., a wholesale sales agent for the medication Plaseebo.

Figure 7:
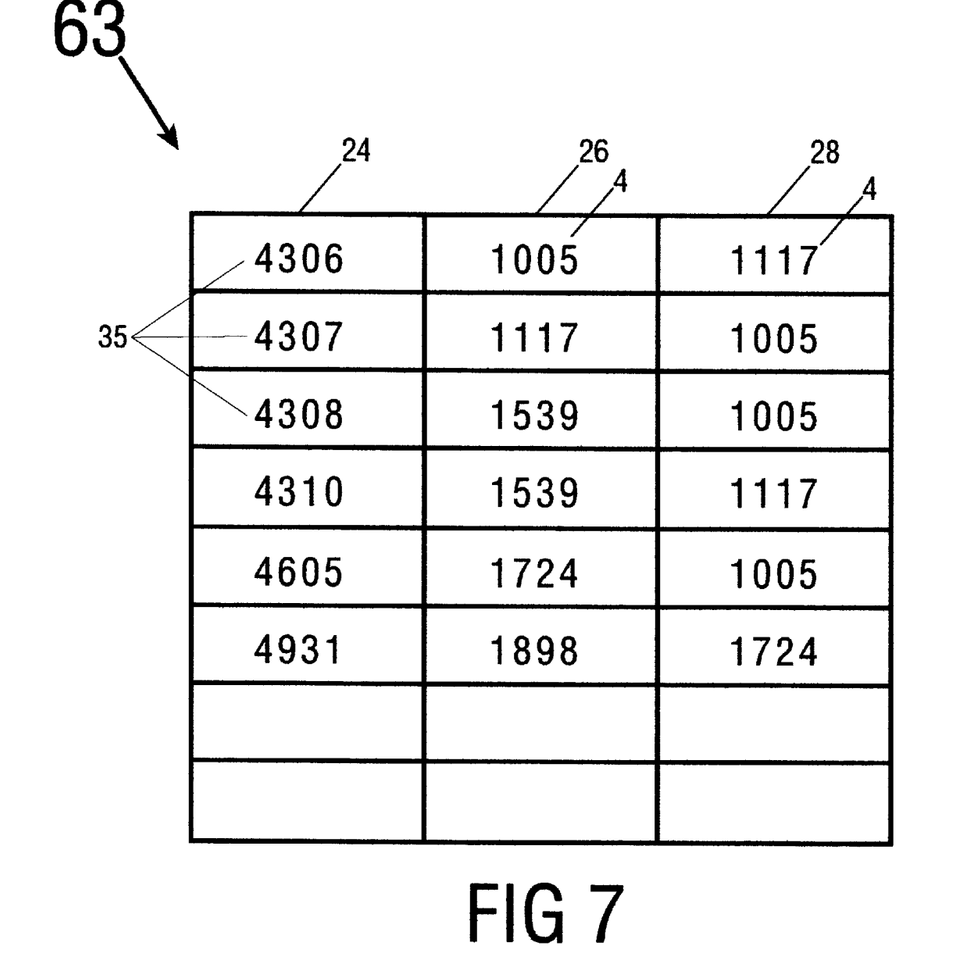
FIG. 7 depicts a set of Relationship Licenses used in the database of FIG. 5.

Referring now to the Figures and particularly to FIGS. 5 and 7, a Relationship License 23A of 4306 listed in FIG. 7 teaches that a relationship exists between Entity License Number 4 of 1005, representing the entity Mary Smith, and Entity License Number 4 of 1117, representing the entity Frank Smith. The placement of the Entity License Number 4 of 1005 in a FROM Entity License Number Field 26, and the placement of the Entity License Number 1117 in a TO Entity License Number Field 28 indicates that a Relationship Attribute License 23A may flow from Entity License Number 1005 to Entity License Number 4 of 1117.

An additional Relationship License Number 23A of 4307 listed in FIG. 7 further teaches that a relationship exists between Entity License Number 4 of 1117, representing the entity Mary Smith, and Entity License Number 4 of 1005, representing the entity Frank Smith, wherein the TO and FROM characteristic of the Entity License Numbers 1005 and 1117 are altered from the orientation of Relationship License Number 4306, and the database tools may infer that a Relationship Attribute License 23A related to Relationship License 4307 has a characteristic that flows from Entity License Number 1117 to Entity License Number 1005.

Figure 8:
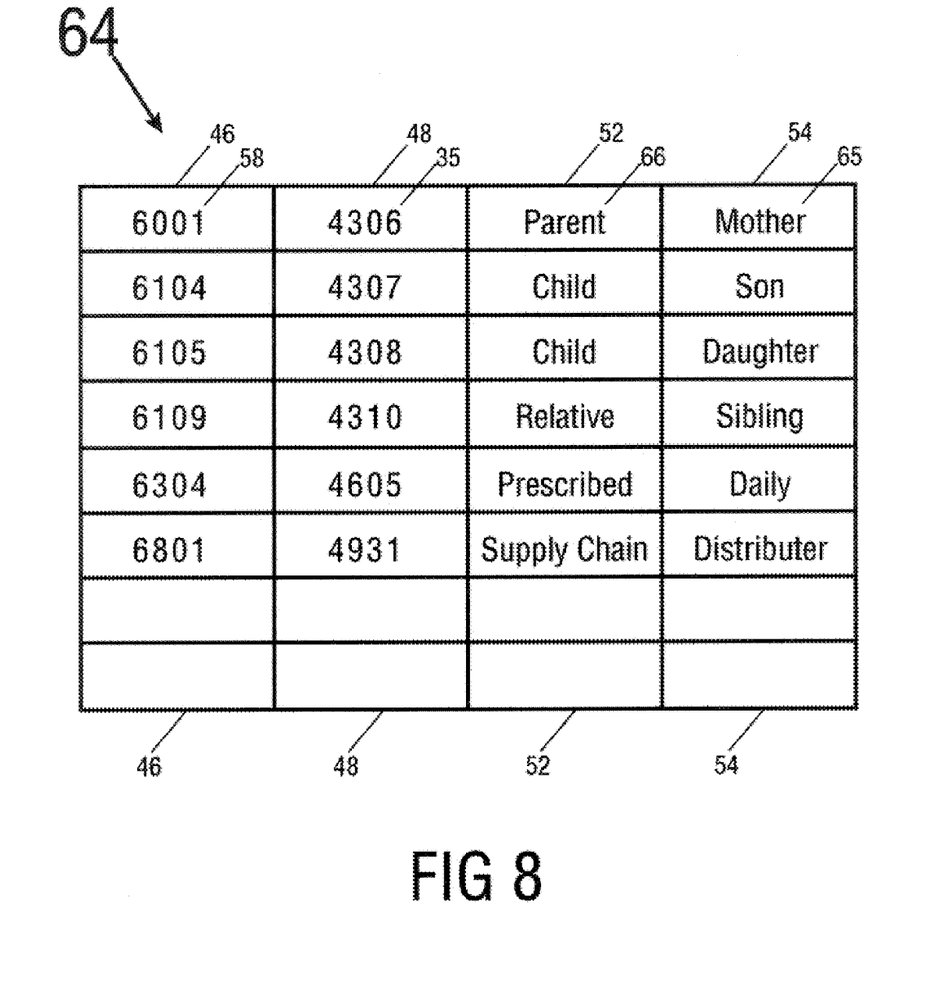
FIG. 8 depicts a set of Relationship Attribute Licenses used in the database of FIG. 5.

Referring now to the Figures and particularly to FIGS. 7 and 8, a Relationship Attribute License 44 of 6001 listed in FIG. 8 relates a Relationship Value 59 MOTHER with a Relationship Name 57 of PARENT to the Relationship License Number 4306. The database thereby relates, in light of Entity License Numbers 1005 and 1117, the Relationship License Number 4306, and the Relationship Attribute License Number 6001, that the Entity License Number 1005, representing the person of Mary Smith, and the Entity License Number 1117, representing the person of Frank Smith, are related in a FROM/TO nature that describes Mary Smith as a parent and mother of Frank Smith.

Referring now generally to the Figures and particularly to FIGS. 5, 7 and 8, a Relationship Attribute License 6104 listed in FIG. 8 relates a Relationship Attribute Value 59 SON with a Relationship Attribute Name 57 of CHILD to the Relationship License Number 4307. The database thereby relates, in light of Entity License Numbers 1117 and 1005, the Relationship License Number 4307, and the Relationship Attribute License Number 6104, that the Entity License Number 1117, representing the person of Frank Smith, and the Entity License Number 1005, representing the person of Mary Smith, are related in a FROM/TO nature that describes Frank Smith as a child and son of Mary Smith.

Another Relationship Attribute License 23A of 6105 listed in FIG. 8 relates a Relationship Value DAUGHTER 59 with a Relationship Name of CHILD 57 to the Relationship License Number 4308. The database thereby relates, in light of Entity License Numbers 1539 and 1005, the Relationship License Number 4308, and the Relationship Attribute License Number 6105, that the Entity License Number 1539, representing the person of Anne Smith, and the Entity License Number 1005, representing the person of Anne Smith, are related in a FROM to nature that describes Anne Smith as a child and daughter of Anne Smith.

Referring now generally to the Figures and particularly FIGS. 3A and 4, an alternate embodiment of the present invention may, with the inclusion of Additional FROM and TO Entity License Fields 30, 32 in a Relationship License 23A, express via a single Relationship License 23A the relating of two or more Entity License Numbers 4 as FROM Entity License Numbers 4 in separate additional FROM Entity License Fields 30 to two or more Entity License Numbers 4 identified in separate additional TO Entity License Number Fields 32. For example, Entity License Numbers 1005 and 1233, where Entity License Number 1233 representing a person of George Smith, father of Anne and Frank Smith, might be separately and respectively entered into a FROM Entity License Number Field 26 and an Additional FROM Entity License Number Field 30.

Furthermore a TO Entity License Number Field 28 might contain the Entity License Number 1117, for Frank Smith, and an Additional TO Entity License Number Field 32 might contain the Entity License Number 1539, for Anne Smith. An alternate embodiment of the present invention might then allow a Relationship Attribute License 44 consisting of an Attribute License Number Field 46 and Number 58, a Relationship License Number Field 48 containing the Relationship License Number 35 of the Relationship License 23A as described above in this paragraph, and a Relationship Attribute Value Field 54 containing a Relationship Value 59 of PARENT to thereby record in the database that Mary Smith and George Smith are related as parents to both Anne Smith and Frank Smith by means of a single Relationship License 23A.

Another alternate embodiment of the present invention might allow the creation of a Relationship License that links Entity License 1005, for Mary Smith, in a FROM Entity 23A License Number Field, to Entity License Number 1117, for Frank Smith, in a TO Entity License Number Field 26, and Entity License Number 1539, for Anne Smith, in an Additional TO Entity License Number Field 28, whereby Mary Smith is related to both Frank Smith and Anne Smith in a FROM/TO vector. Preferred embodiments employing this alternate methodology might further include a Relationship Attribute License 44containing a Relationship Attribute License Field 46 and Number 58, a Relationship License Number Field 48 containing a Relationship License Number 35 of the Relationship License 23A as described above within this paragraph, a Relationship Attribute Name Field 52 and Name 57 of PARENT, and a Relationship Value Field 54 and Value 59 of MOTHER. The database 62 may thus thereby establish that Mary Smith is related as parent and mother to both Anne Smith and Frank Smith by means of a single Relationship License 23A.

Referring now generally to the Figures and particularly to FIGS. 1B, 7 and 8, a Relationship Attribute License 44 of 6109 listed in FIG. 8 relates a Relationship Attribute Name 66 RELATIVE with a Relationship Value 65 of SIBLING to the Relationship License Number 35 of 4310. The database 62 thereby relates, in light of Entity License Numbers 1539 and 1117, the Relationship License Number 4310, and the Relationship Attribute License Number 6109, that the Entity License Number 1539, representing the person of Anne Smith, and the Entity License Number 1117, representing the person of Frank Smith, are related in a FROM/TO nature that describes Anne Smith as a relative and sibling to Frank Smith.

Referring now generally to the Figures and particularly to FIG. 3B and FIG. 8 a Relationship Attribute License 6109 listed in FIG. 8 relates a Relationship Attribute Name RELATIVE 66 with a Relationship Attribute Value of SIBLING 65. Certain alternate preferred embodiments of the method of the present invention may denote the SIBLING Relationship Attribute Value 65 as having a neutrality or mutuality characteristic, rather a FROM/TO vector, whereby Anne Smith and Frank Smith are denoted as have a sibling relatedness that is bi-directional in nature. This denotation may be accomplished by recognizing the Relationship Attribute Value of SIBLING 65 as having a bi-directional characteristic that supercedes a FROM/TO characteristic of a Relationship License 23A, 23B, 23C, or by means of a binary value 41 stored in an optional Tag Field 40, or another distinguishing method known in the art.

Referring now generally to the Figures and particularly to FIGS. 1B, 5, 7 and 8, a Relationship Attribute License 6304 listed in FIG. 8 relates a Relationship Attribute Value 65 DAILY with a Relationship Attribute Name 66 of PRESCRIBED to the Relationship License Number 4605. The Relationship License 4605 includes a FROM Entity License Number Field 26 containing an Entity License Number 1724, and a TO Entity License Number Field 28 containing the Entity License Number 1005. The Entity License Number 1724, as shown in FIG. 1B, is configured to denote a medication Plaseebo. Relationship Attribute License 6304, Relationship License 4605, Entity License 1724 and Entity License 1005 thereby enable the database to record that Mary Smith has been prescribed the medication of Plaseebo on a daily basis Another Relationship Attribute License 6801 listed in FIG. 8 relates a Relationship Attribute Name 66 of SUPPLYCHAIN with a Relationship Attribute Value 65 of DISTRIBUTOR to the Relationship License Number 4931. The Relationship License 4931 includes a FROM Entity License Number Field 26 containing an Entity License Number 1898, and a TO Entity License Number Field 28 containing the Entity License Number 1724. The Entity License Number 1898, as shown in FIG. 1B, signifies the wholesale distributor Drugs Worldwide, Inc., and the Entity License 1724 is also shown in FIG. 1B, and as discussed above, to denote the medication Plaseebo. Relationship Attribute License 6801, Relationship License 4931, Entity License 1898 and Entity License 1724 thereby enable the database to record that the distributor Drugs Worldwide, Inc is a distributor in the supply chain of the medication Plaseebo. The Relationship Licenses 4605 and 4931, in combination with Relationship Attribute Licenses 6304 and 6801, thereby record in the database that the Plaseebo medication prescribed to Mary Smith is provided by means of the distributor Drugs Worldwide, Inc.

Figure 6:
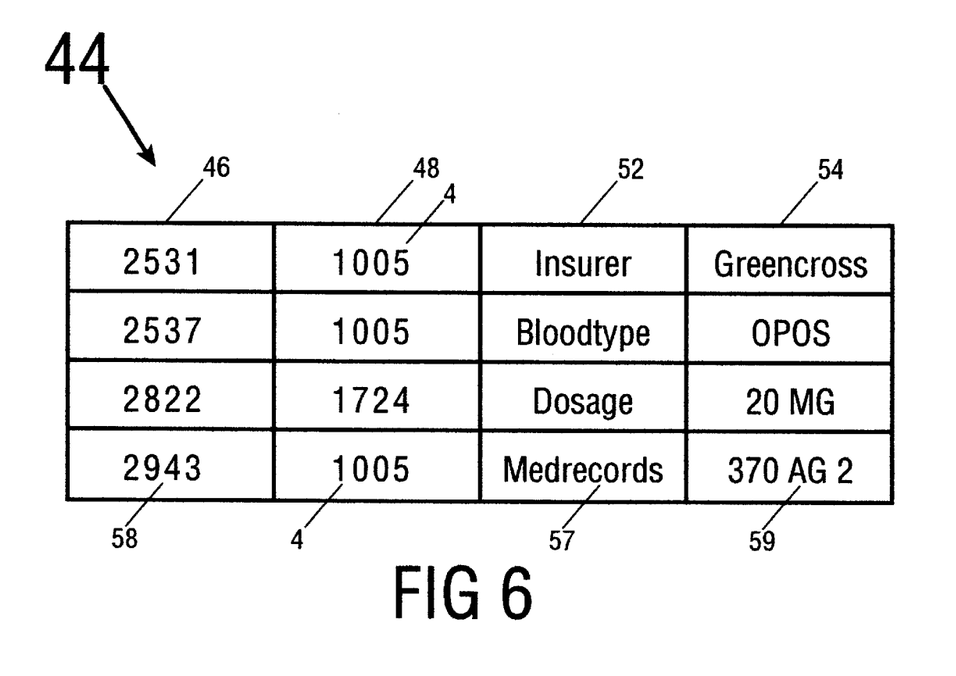
FIG. 6 depicts a set of Attribute Licenses used in the database of FIG. 5.

Referring now generally to the Figures, and particularly to FIGS. 5 and 6, a number of Attribute Licenses 44 are included in the database to relate pairs of Attribute Names 57 and Attribute Values 59 to Entity Licenses 2 as specified in separate and individual Attribute Licenses 44. An Attribute License 2532, mentioned as a first example, includes an Attribute License Number Field 46 containing an Attribute License Number 58 of 2531, an Entity License Number Field 48 containing the Entity License Number 4 of 1005, an Attribute Name Field 52 containing an Attribute Name INSURER 57, and an Attribute Value Field 54 containing an Attribute Value 59 of GREENCROSS. The Attribute License44 of 2531 thereby records in the database that the Attribute Value 59 of GREENCROSS and the Attribute Name 57 of INSURER are related to the Entity License Number 1005, and that Entity License Number 1005 relates to the person or entity of Mary Smith.

Another Attribute License 44 of 2537, mentioned as a second example, includes an Attribute License Number Field 46 containing an Attribute License Number 58 of of 2537, an Entity License Number Field 48 containing the Entity License Number 4 of 1005, an Attribute Name Field 52 containing an Attribute Name 57 BLOODTYPE, and an Attribute Value Field 54 containing an Attribute Value 59 of OPOS. The Attribute License 2537 thereby records in the database that the Attribute Value 59 of OPOS and the Attribute Name 57 of BLOODTYPE are related to the Entity License Number 1005, and that Entity License Number 1005 relates to the person or entity of Mary Smith.

A third Attribute License 44 of Attribute License Number 58 of 2822 includes an Attribute License Number Field 46 containing an Attribute License Number 58 of 2822, an Entity License Number Field 48 containing the Entity License Number 4 of 1724, an Attribute Name Field 52 containing an Attribute Name 57 of DOSAGE, and an Attribute Value Field 54 containing an Attribute Value 59 of 20MG. The Attribute License 2822 thereby records in the database that the Attribute Value 59 of 20 MG and the Attribute Name 57 of DOSAGE are related to the Entity License Number 4 of 1724, and that Entity License Number 1724 relates to the person or entity of the medication Plaseebo. The Attribute License 2822 establishes, in concert with various Entity Licenses 2, Relationship Licenses 23A, 23B, 23C and Relationship Attribute Licenses 44 discussed above, that Mary Smith's prescription of a daily intake of Plaseebo is set at a dosage of 20 milligrams.

A fourth Attribute License 44 of Attribute License Number 58 of 2943 includes an Attribute License Number Field 46 containing an Attribute License Number 58 of 2943, an Entity License Number Field 48 containing the Entity License Number 4 of 1005, an Attribute Name Field 52 containing an Attribute Name 57 of MEDRECORDS, and an Attribute Value Field 54 containing an Attribute Value 59 of 370AG2. The Attribute License 2943 thereby records in the database that the Attribute Name 57 of MEDRECORDS and the Attribute Value 59 of 370SG2 are related to the Entity License Number 1005, and that Entity License Number 1005 relates to the person or entity of Mary Smith.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A computer implemented process for associating data within a database comprising:
   a. assigning a first unique entity license number;
   b. assigning a second unique entity license number;
   c. creating a relationship license, the relationship license comprising:
      i. a unique relationship license number;
      ii. the first entity license number;
      iii. the second entity license, number whereby the first and second entity license numbers are both associated with the relationship license number;
   d. tagging the first entity license number with a FROM quality;
   e. tagging the first entity license number with a FROM quality;
   f. tagging the second entity license number with a TO quality, whereby a vector from the first entity license and to the second entity license is designated;
   g. assigning at least one additional unique entity license number;
   h. including at least one additional entity license number in the relationship license; and
   i. tagging at least one additional entity licensed with the TO quality, whereby the attribute license includes at least one FROM entity license number and at least more than one TO entity license number.

2. A computer implemented process for associating data within a database comprising:
   a. assigning a first unique entity license number;
   b. assigning a second unique entity license number;
   c. creating a relationship license the relationship license comprising:
      i. a unique relationship license number;
      ii. the first entity license number;
      iii. the second entity license number, whereby the first and second entity license numbers are both associated with the relationship license number;
   d. tagging the first entity license number with a FROM quality;
   e. tagging the first entity license number with a FROM quality;
   f. tagging the second entity license number with a TO quality, whereby a vector from the first entity license and to the second entity license is designated;
   g. assigning at least one additional unique entity license number;
   h. including at least one additional entity license number in the relationship license; and
   i. tagging at least one additional entity licensed with the FROM quality, whereby the attribute license includes at least one TO entity license number and at least more than one FROM entity license number.

3. A computer implemented process for associating data within a database comprising:
   a. assigning a first unique entity license number;
   b. assigning a second unique entity license number;
   c. creating a relationship, license the relationship license comprising:
      i. a unique relationship license number;
      ii. the first entity license number;
      iii. the second entity license, number whereby the first and second entity license numbers are both associated with the relationship license number;
   d. tagging the first entity license number with a FROM quality; and
   e. tagging the first entity license number with a FROM quality;
   f. tagging the second entity license number with a TO quality, whereby a vector from the first entity license and to the second entity license is designated;
   g. assigning at least a first additional unique entity license number and a second additional entity license number
   h. including at least the first additional entity license number and the second additional entity license number in the relationship license;
   i. tagging at least the first additional entity licensed with the FROM quality; and
   j. tagging at least the second additional entity license number with the TO quality, whereby the attribute license includes at least more than one TO entity license number and at least more than one FROM entity license number.

* * * * *